US012745228B1

(12) United States Patent
Rofougaran et al.

(10) Patent No.: US 12,745,228 B1
(45) Date of Patent: Sep. 22, 2026

(54) ADAPTIVE FREQUENCY RESOLUTION BASED ON SIGNAL COMPLEXITY

(71) Applicant: PELTBEAM INC., Sherman Oaks, CA (US)

(72) Inventors: Ahmadreza Rofougaran, Newport Beach, CA (US); Mehdi Hatamian, Mission Viejo, CA (US); Shervin Alireza Odabaee, Newport Coast, CA (US); Arman Rofougaran, Newport Beach, CA (US); Milan Rofougaran, Newport Coast, CA (US); Kavian Odabaee, Newport Coast, CA (US)

(73) Assignee: Peltbeam Inc., Sherman Oaks, CA (US)

( * ) Notice: Subject to any disclaimer, the term of this patent is extended or adjusted under 35 U.S.C. 154(b) by 0 days.

(21) Appl. No.: 19/568,877

(22) Filed: Mar. 17, 2026

(51) Int. Cl.
*H04W 72/0453* (2023.01)
*H04W 72/542* (2023.01)

(52) U.S. Cl.
CPC ..... *H04W 72/0453* (2013.01); *H04W 72/542* (2023.01)

(58) Field of Classification Search
None
See application file for complete search history.

(56) References Cited

U.S. PATENT DOCUMENTS

2009/0253376 A1* 10/2009 Parssinen .............. H04W 72/02 455/62
2014/0079248 A1* 3/2014 Short ...................... G10L 25/18 381/119
2024/0040480 A1* 2/2024 Munir ................. H04W 72/541
2025/0203380 A1* 6/2025 Montalvo ............... G06F 30/27
2026/0101211 A1* 4/2026 Struhl ................... H04W 24/08

* cited by examiner

*Primary Examiner* — Walter J Divito
(74) *Attorney, Agent, or Firm* — CHIP LAW GROUP

(57) ABSTRACT

A wireless communication device includes a processor that receives radio frequency (RF) signal data of one or more RF signals associated with one or more RF signal sources. The processor generates a plurality of frequency bins from the received RF signal data based on a default resolution mode preset at the wireless communication device. The default resolution mode is associated with a first frequency bin size. The processor determines that the one or more RF signals are present in one of overlapping frequency bins or distinct frequency bins within the plurality of frequency bins and assigns a complexity level to the received RF signal data based on the determination. The processor transitions from the default resolution mode to one of a first resolution mode or a second resolution mode based on the assigned complexity level.

20 Claims, 4 Drawing Sheets

ADAPTIVE FREQUENCY RESOLUTION BASED ON SIGNAL COMPLEXITY

FIELD OF TECHNOLOGY

Certain embodiments of the disclosure relate to wireless communication devices and spectrum analysis systems. More specifically, certain embodiments of the disclosure relate to a wireless communication device and a method for adaptive frequency resolution based on signal complexity, for example, for monitoring of radio frequency spectrum.

BACKGROUND

The rapid growth of wireless communication technologies and the increasing demand for high-bandwidth applications have led to significant challenges in the current spectrum management landscape. Spectrum monitoring helps spectrum regulators to plan and use frequencies, avoid incompatible usage, and identify sources of harmful signal interference. The signal interference is a growing problem due to the growing number of spectrum users. Equipment such as spectrum analyzers are useful tools for analyzing and monitoring radio frequency (RF) signals. The spectrum analyzers are useful for wireless communications testing, ensuring regulatory compliance, and troubleshooting RF signal interference. Spectrum analyzers play vital role in RF design, testing, and electronic circuit development. Conventional spectrum analyzers, while effective to a certain extent, face several limitations in a frequency resolution and signal discrimination. Currently, there are many technical challenges in spectrum monitoring and signal analysis across multiple frequency bands in increasingly congested electromagnetic environments where multiple RF signals may be closely spaced in frequency.

Further limitations and disadvantages of conventional and traditional approaches will become apparent to one of skill in the art through comparison of such systems with some aspects of the present disclosure as set forth in the remainder of the present application with reference to the drawings.

BRIEF SUMMARY OF THE DISCLOSURE

A wireless communication device and a method for adaptive frequency resolution based on signal complexity, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Figure 1:
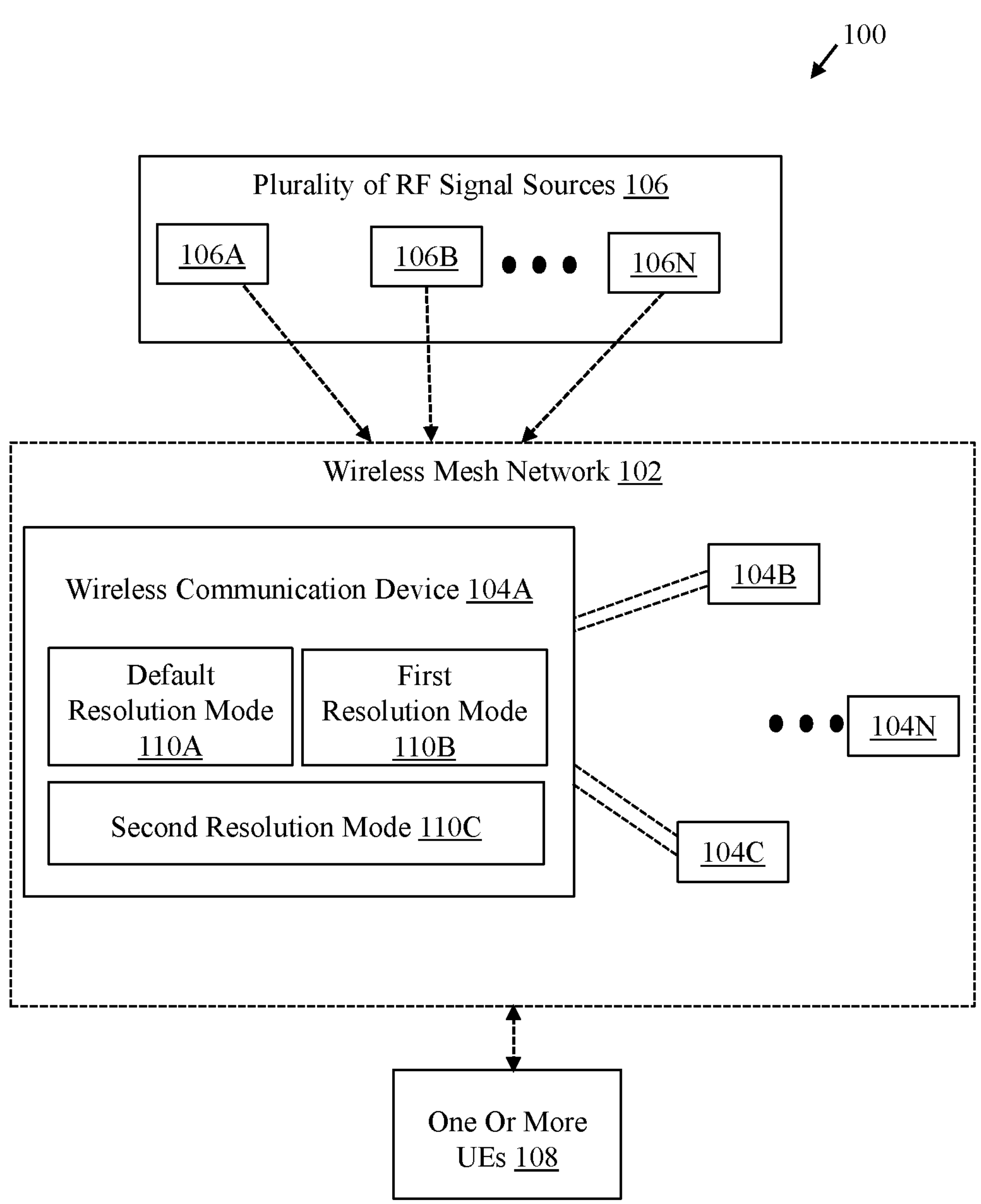
FIG. 1 is a diagram that illustrates an exemplary system for adaptive frequency resolution based on signal complexity, in accordance with an exemplary embodiment of the disclosure.

Certain embodiments of the disclosure may be found in a wireless communication device and a method for adaptive frequency resolution based on signal complexity.

Current spectrum analysis solutions generally fall into two categories: coarse frequency resolution analyzers and fine frequency resolution analyzers. Coarse resolution analyzers operate with larger frequency bin sizes, introducing signal overlaps when multiple RF signals are closely spaced in frequency. Fine resolution analyzers offer comparatively better signal discrimination as compared to the coarse frequency resolution analyzers but require complex and expensive computational resources for large-point Fast Fourier Transform (FFT) processing. Both approaches typically operate with fixed frequency resolution settings regardless of signal conditions, further increasing system inefficiency and computational overhead. Such limitations become particularly problematic in modern wireless environments characterized by, for example: (a) increasing spectrum congestion with signals having varying frequency spacings; (b) dynamic signal conditions requiring different resolution capabilities; (c) need for distinguishing closely spaced signals without constant high computational load; (d) requirements for resource utilization across different signal complexity scenarios; and (e) complex signal environments requiring adaptive frequency discrimination. With conventional systems, while adjustable FFT-based solutions offer some flexibility, the conventional systems often lack automated means to detect signal overlapping conditions and adjust the frequency resolution accordingly. Additionally, conventional spectrum analysis methods face significant limitations in detecting overlapping versus distinct frequency bins, hindering effective signal discrimination in congested spectrum environments. Furthermore, there are computational resource constraints with the conventional systems used for spectrum monitoring. Fixed high-resolution configurations require excessive processing resources, while fixed low-resolution configurations sacrifice signal discrimination capability. Conventional spectrum analyzers may require either coarse resolution for fast scanning or fine resolution for detailed analysis, creating a fundamental trade-off between processing speed and frequency discrimination capability.

In contrast to conventional systems, the disclosed wireless communication device provides an automated, signal-complexity-driven adaptive frequency resolution capability that eliminates the fundamental trade-off between processing speed and frequency discrimination. The fixed coarse resolution analyzers that operate with large frequency bin sizes introduce signal overlaps when multiple RF signals are closely spaced. The fine resolution analyzers offer better signal discrimination than the fixed coarse resolution analyzers but require complex and expensive computational resources for large-point FFT processing. The conventional approaches operate with fixed frequency resolution settings regardless of actual signal conditions, leading to either constant high computational overhead or poor signal discrimination in congested spectrum environments. The disclosed wireless communication device overcomes such limitations through an advanced system that automatically detects when RF signals are present in overlapping versus distinct frequency bins. The disclosed wireless communication device assigns a complexity level to the signal environment based on the degree of overlap detected and automatically transitions from a computationally efficient default resolution mode to finer resolution modes based on the assigned complexity level, without any user intervention or manual adjustment.

The disclosed wireless communication device provides a concrete technical solution through the combination of automated overlap detection, complexity assessment, and dynamic resolution switching. For example, the device operates in the default resolution mode with a first frequency bin size when signals are adequately separated in distinct frequency bins, thereby achieving the processing speed and computational efficiency of a coarse resolution analyzer during normal operation. When the automatic overlap detection mechanism determines that RF signals are present in overlapping frequency bins, the disclosed system (e.g., a wireless communication device) automatically assigns an appropriate complexity level and transitions to either a first resolution mode with a second frequency bin size or a second resolution mode with a third frequency bin size with improved frequency resolution capability, thereby achieving the frequency discrimination capability higher than even a standard fine resolution analyzer with improved accuracy. This selective application of high-resolution processing only when signal complexity warrants reduce average computational load substantially compared to the fixed high-resolution analyzers while maintaining equivalent signal discrimination capability when closely-spaced signals are present.

The disclosed wireless communication device addresses one or more technical limitations in the conventional systems. The disclosed adaptive frequency resolution enables complexity level determination with automatic dynamic resolution mode selection to reduce computational resource consumption as compared to conventional systems. Thus, the disclosed wireless communication device and method may provide high-performance adaptive frequency resolution for spectrum analysis across multiple frequency bands with reduced computational resource consumption compared to conventional systems.

FIG. 1 is a diagram that illustrates an exemplary system for adaptive frequency resolution based on signal complexity, in accordance with an exemplary embodiment of the disclosure. With reference to FIG. 1, there is shown a system 100 for the adaptive frequency resolution based on signal complexity. The system 100 may include a plurality of wireless communication devices, such as wireless communication devices 104A, 104B, 104C, . . . , 104N, and a plurality of RF signal sources 106 (e.g., RF signal sources 106A, 106B, . . . , 106N). In an implementation, the wireless communication devices 104A, 104B, 104C, . . . , 104N may be interconnected in a wireless mesh network 102. The system 100 may further include one or more user equipment (UEs) 108. The wireless communication device 104A may operate in one of a default resolution mode 110A, a first resolution mode 110B, or a second resolution mode 110C. Each of the wireless communication devices 104A, 104B, 104C, . . . , 104N may function independently for the adaptive frequency resolution or may work in cooperation for spectrum sensing and wireless data communication across the wireless mesh network 102.

The wireless mesh network 102 may be a resilient, high-capacity wireless network that extends the reach of a fiber backbone to provide widespread coverage to end users, such as the one or more UEs 108, via the wireless communication devices 104A, 104B, 104C, . . . , 104N. The fiber backbone may be a high-performance, fiber-optic core network infrastructure that connects central offices, data centers, and the wireless mesh network 102. The fiber backbone may aggregate traffic from the central offices and data centers and provide seamless integration between the fiber and wireless network components, such as the wireless mesh network 102.

The wireless communication devices 104A, 104B, 104C, . . . , 104N may also be referred to as mesh nodes. Each of the wireless communication devices 104A, 104B, 104C, . . . , 104N may be configured to capture and monitor raw RF signals from direct current (DC, i.e., 0 hertz (Hz)) to 300 Gigahertz (GHz) and analyze the captured RF signals. Each of the wireless communication devices 104A, 104B, 104C, . . . , 104N may be a multi-functional device for spectrum-sensing across a plurality of frequency bands (DC to 300 GHz) and for wireless data communication with various wireless communication devices in the wireless mesh network 102. Examples of the wireless communication devices 104A, 104B, 104C, . . . , 104N may include but are not limited to a spectrum monitoring device or a dual-purpose device for spectrum sensing and wireless data communication, a modified repeater device, or a 5G backplane system.

There are further shown the plurality of RF signal sources 106 configured to transmit radio frequency signals. The plurality of RF signal sources 106 may include various types of wireless transmission sources operating across multiple frequency bands. The plurality of RF signal sources 106 may include, for example, Wi-Fi® devices operating at 2.4 gigahertz (GHz), 5 GHz, 6 GHz, or 7 GHz frequency bands, cellular base stations transmitting 4G, 5G, or 6G signals, IoT devices operating in unlicensed or industrial, scientific, and medical (ISM) frequency bands, radar systems, or millimeter-wave communication systems. The wireless communication devices 104A, 104B, . . . , 104N may not be initially aware of the plurality of RF signal sources 106 and may scan for RF signals to detect and identify active RF signals operating on specific frequencies within range. The wireless communication devices 104A, 104B, . . . , 104N may receive RF signal data from the plurality of RF signal sources 106 for spectrum analysis.

Each of the one or more UEs 108 may correspond to a wireless device, such as a client device or a telecommunication hardware used by an end user to communicate. Some of the one or more UEs 108 may refer to a combination of a mobile equipment and subscriber identity module (SIM). Examples of the one or more UEs 108 may include, but are not limited to a smartphone, a laptop, a desktop machine, a customer premise equipment, a virtual reality headset, an augmented reality device, a wireless modem, a home router, a Wi-Fi® enabled smart television (TV) or set-top box, a VoIP station, or any customized hardware for wireless communication.

The first resolution mode 110B may be defined as the mode that has the predefined subcarrier spacing parameter value that is different from the subcarrier spacing parameter value in the default resolution mode 110A. The second resolution mode 110C may be defined as the mode that has the subcarrier spacing parameter value different from the subcarrier spacing parameter value in the default resolution mode 110A and the first resolution mode 110B. The default resolution mode 110A may be associated with a plurality of frequency bins with a first frequency bin size. The first resolution mode 110B may be associated with the plurality of frequency bins with a second frequency bin size less than the first frequency bin size. The second resolution mode 110C may be associated with a plurality of frequency bins with the third frequency bin size less than the second frequency bin size. The default resolution mode 110A may provide frequency resolution of RF signals with low processing load. The first resolution mode 110B may provide finer frequency resolution than the default resolution mode 110A with moderate processing load for separating overlapping signals. The second resolution Mode 110C may provide even finer resolution than the first resolution mode 110B with high processing ability for separating closely-spaced signals.

The various operations of the disclosed system 100 may be explained by taking an example of one wireless communication device, such as the wireless communication device 104A. It is to be understood that operations described for the wireless communication device 104A may be applicable to the wireless communication devices 104B, 104C, . . . , 104N. For example, each of the wireless communication devices 104A, 104B, 104C, . . . , 104N may be configured to perform spectrum analysis with adaptive frequency resolution capability while utilizing the processing capabilities of the processor 230 configured for FFT-based spectrum processing to achieve flexible frequency discrimination across multiple frequency bands with reduced computational resource consumption.

Each of the wireless communication devices 104A, 104B, 104C, . . . , 104N may be configured to perform wideband spectrum monitoring with high sensitivity and dynamic range while intelligently utilizing the processing capabilities of a WLAN chipset (e.g., IEEE 802.11be chipset and modems) modified for signal monitoring with intelligent signal down conversion and signal processing architectures to achieve wide frequency range coverage (DC to 300 GHz) in a cost-effective manner. Typically, IEEE 802.11be/ax (Wi-Fi® 7/6E) hardware is conventionally designed for high-throughput wireless networking, operating in 2.4 GHz, 5 GHz, and 6 GHz bands. The IEEE 802.11be/ax (Wi-Fi® 7/6E) hardware provides features such as multi-link operation (MLO), 320 MHz channels, 4K Quadrature Amplitude Modulation (QAM) modulation, and multi-user Multiple-Input Multiple-Output (MIMO) primarily for data communication between access points and client devices.

The present disclosure modifies and repurposes IEEE 802.11be/ax hardware beyond its standard networking role by integrating wideband spectrum monitoring capabilities. Typically, IEEE 802.11be/ax hardware can only process frequencies ranging from 1-7 GHz and such IEEE 802.11be/ax hardware are not meant for spectrum monitoring. In an example, the wireless communication device 104A may leverage the hardware's advanced signal processing capabilities while extending frequency coverage from DC to 300 GHz through multi-stage conversion. Details about the operation of the wireless communication device 104A are explained, for example, in FIG. 2.

In an implementation, multiple monitoring nodes, such as the wireless communication devices 104A, 104B, 104C, . . . , 104N, may operate concurrently across different frequency bands. In such a case, each node may perform local adaptive frequency resolution based on signal complexity detected at the location of each node. The distributed approach may further allow for spatial coverage, improved signal discrimination through independent resolution adaptation, and scalable deployment with reduced computational resource consumption. Each of the wireless communication devices 104A, 104B, 104C, . . . , 104N may independently determine the frequency spacing between the RF signals, identify the overlapping or the distinct frequency bins, and assign complexity levels based on local signal conditions. Each of the wireless communication devices 104A, 104B, 104C, . . . , 104N may transition among the default resolution mode 110A, the first resolution mode 110B, and the second resolution mode 110C based on the assigned complexity level to adjust frequency discrimination for the frequency spacing of the detected signal. The wireless communication devices 104A, 104B, 104C, . . . , 104N may transfer status of the resolution mode and information of the frequency bin through the wireless mesh network 102 to facilitate coordinated spectrum awareness across the network. The distributed adaptive architecture enables each wireless communication device (e.g., the wireless communication device 104A) to independently adjust frequency resolution based on local signal complexity that static systems fail to adapt dynamically. The adaptive resolution capability may improve signal discrimination accuracy through dynamic frequency bin size adjustment. Each wireless communication device may reduce the computational overhead by operating in lower resolution modes when signal spacing permits while retaining capability to transition to higher resolution modes when closely spaced signals are detected. The distributed adaptive approach may provide spectrum analysis with the reduced computational resource consumption compared to fixed-resolution processing systems.

Figure 2:
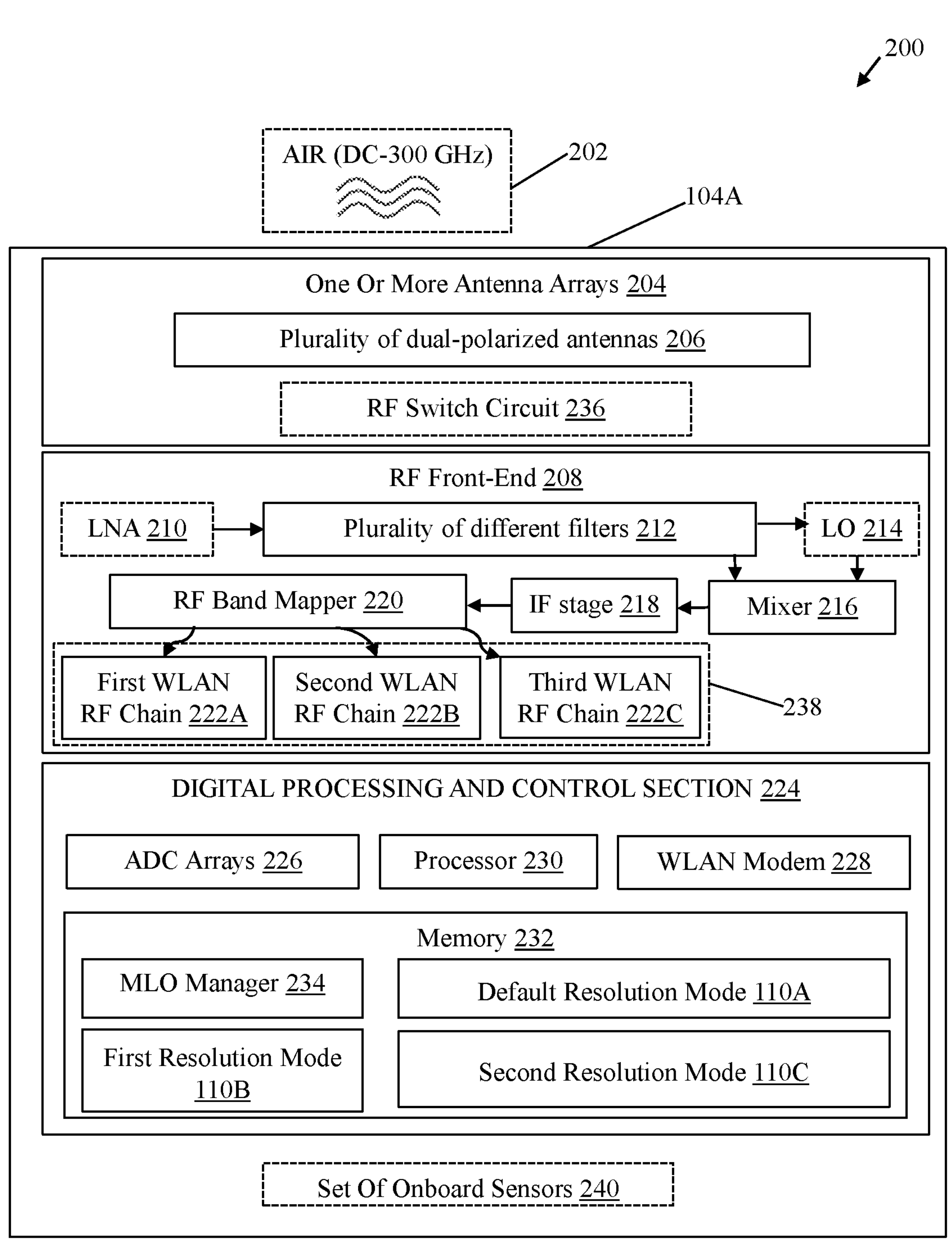
FIG. 2 is a block diagram that illustrates various components of an exemplary wireless communication device for adaptive frequency resolution based on signal complexity, in accordance with an exemplary embodiment of the disclosure.

FIG. 2 is a block diagram that illustrates various components of an exemplary wireless communication device for adaptive frequency resolution based on signal complexity, in accordance with an exemplary embodiment of the disclosure. FIG. 2 is explained in conjunction with elements from FIG. 1. With reference to FIG. 2, there is shown a block diagram 200 of the wireless communication device 104A.

The wireless communication device 104A may include an antenna array system, such as one or more antenna arrays (e.g., multiple-input-multiple-output (MIMO) antenna arrays). The one or more antenna arrays 204 may include a plurality of dual-polarized antennas 206. In an implementation, the antenna array system, such as the one or more antenna arrays 204 (e.g., a MIMO antenna array), may include a radio frequency (RF) switch circuit 236. The wireless communication device 104A may include an RF front-end 208 and a digital processing and control section 224.

The RF front-end 208 may include a Low-Noise Amplifier (LNA) 210, a plurality of different filters 212, a local oscillator (LO) 214, a mixer 216, an intermediate frequency (IF) stage 218, an RF band mapper 220, and a WLAN radio 238 (e.g., an IEEE 802.11be radio) including distinct RF chains for concurrent operations across different frequency bands, such as a first WLAN RF chain 222A (e.g., RF chain 1 for 2.4 GHz band processing), a second WLAN RF chain 222B (e.g., RF chain 2 for 5 GHz band processing), and a third WLAN RF chain 222C (e.g., RF chain 3 for 6 GHz band processing). Each chain may include dedicated components (e.g., LNA, mixers, filters) optimized for its specific frequency band, enabling simultaneous multi-band operation.

The digital processing and control section 224 may be configured to handle digital processing (e.g., analog to digital conversions, digital signal processing, multi-link operations (MLO) processing, baseband processing etc.), WLAN modem functions, as well as system control functions (e.g., system-on-chip (Soc)). The digital processing and control section 224 may include ADC arrays 226, a WLAN modem 228, a processor 230, and a memory 232 with an MLO manager 234. In an implementation, the wireless communication device 104A may further include a set of onboard sensors 240. The memory 232 further includes the default resolution mode 110A, the first resolution mode 110B, and the second resolution mode 110C.

The one or more antenna arrays 204 may include the plurality of dual-polarized antennas 206 configured to receive radio frequency signals in vertical and horizontal polarizations across the plurality of frequency bands, for example, ranging from direct current (DC) to 300 GHz. The one or more antenna arrays 204 may incorporate dedicated MIMO elements for 2.4/5/6 GHz Wi-Fi® bands and wideband elements for full spectrum coverage enabling comprehensive spectrum sensing capabilities across multiple frequency bands (i.e., not only supports primary coverage from 1-7 GHz but manifest extended range capability to DC-300 GHz through multi-stage conversion techniques).

The RF front-end 208 may be configured to apply band-specific filtering to the received radio frequency signals to isolate signals-of-interest with at least 50-80 decibels of spurious signal suppression. In an implementation, the RF front-end 208 may maintain a noise figure below 3 decibels and phase noise performance of −110 decibels relative to carrier (dBc)/Hertz (Hz) at 10 kilohertz (kHz) offset with dynamic range exceeding 90 decibels. The RF front-end 208 may include low noise amplification stages, pre-filtering components, first stage mixing with local oscillator, and initial intermediate frequency stage processing.

The RF band mapper 220 may be configured to perform mapping of received radio frequency signals to predefined intermediate frequencies (e.g., 2.4 GHz, 5 GHz, or 6 GHz). The RF band mapper 220 may allow concurrent processing of signals across multiple frequency bands. The RF band mapper 220 may perform demultiplexing of signals into WLAN bands (Wi-Fi® bands) and provide dedicated signal paths for 2.4/5/6 GHz processing with multi-stage frequency conversion.

The ADC arrays 226 may refer to analog-to-digital converter arrays configured to digitize the down-converted signals for processing. The WLAN modem 228 may include a wireless local area network modem configured to handle baseband signal processing, including digital processing operations such as Fast Fourier Transform (FFT)/Inverse Fast Fourier Transform (IFFT), signal equalization, Medium Access Control (MAC) layer processing, and Quality of Service (QoS) management.

The processor 230 may be configured to execute spectrum analysis operations including frequency bin generation, signal complexity determination, and resolution mode transitions. The processor 230 may be part of a system-on-chip (SoC) and may incorporate one or more processing units including Central Processing Unit (CPU), Digital Signal Processor (DSP), and specialized signal processing units for Fast Fourier Transform (FFT) operations.

The memory 232 may refer to a storage configured to store the resolution modes. The memory 232 may store the different resolution modes (e.g., the default resolution mode 110A, the first resolution mode 110B, or the second resolution mode 110C). Examples of implementation of the memory 232 may include, but are not limited to, a random access memory (RAM), a dynamic random access memory (DRAM), a static random access memory (SRAM), a processor 230 cache, a thyristor random access memory (T-RAM), a zero-capacitor random access memory (Z-RAM), a read only memory (ROM), a hard disk drive (HDD), a secure digital (SD) card, a flash drive, cache memory, and/or a different non-volatile memory.

The MLO manager 234 may include a multi-link operation manager configured to control concurrent processing across multiple frequency bands and manage system interfaces for coordinated operation.

The RF switch circuit 236 may include a radio frequency switch circuit configured to route signals between multiple antenna elements with switching time less than 100 microseconds and frequency step size of 100 kHz. The RF switch circuit 236 may allow rapid transitions between frequency bands for continuous spectrum monitoring. In an implementation, the RF switch circuit 236 may be configured to perform dynamic beam steering by switching between different phased antenna arrays installed at different positions around the wireless communication device 104A to route RF signals along different directions as required. This allows adaptable signal propagation, responding to changing network conditions and optimizing communication paths for improved reliability and performance.

The set of onboard sensors 240 may include environmental and operational sensors configured to provide supplementary data to support signal classification and threat assessment capabilities, where the sensors allow contextual awareness for signal processing decisions. For example, the set of onboard sensors 240 may include one or more image sensors, a Light Detection and Ranging (LIDAR) sensor, a radar sensor, a spatial position sensor, an inertial measurement unit (IMU) sensor, and a temperature sensor. A wide range of sensors may be integrated or connected to enrich each wireless communication device 104A with environmental awareness for intelligent intra-node and inter-node optimizations. For example, the one or more image sensors may be used to visually monitor the surroundings of each network node. The lidar sensor may be referred to as light detection and ranging sensors used to allow accurate three-dimensional (3D) profiling and depth perception of surroundings of each network node for precise beam alignment. The radar sensor may be a built-in radar to detect and track motion to monitor movement patterns of surrounding objects and predict potential RF signal blockers. The spatial position sensor may be a global navigation satellite system (GNSS) sensor, such as global positioning system (GPS) to provide location awareness for each network node used for geospatial analytics and positioning capabilities. The IMU sensor may include a combination of accelerometers, gyroscopes, and magnetometers (sometimes magnetometers may not be used) that typically measures the body's specific force, angular rate, and orientation of a given body. In this case, such raw IMU output may be processed to measure node vibrations, shocks, and orientation changes at each network node.

In operation, the wireless communication device 104A may include one or more antenna arrays 204 configured to receive one or more radio frequency (RF) signals in vertical and horizontal polarizations across a plurality of frequency bands. The one or more antenna arrays 204 represent spatial arrangements of antenna elements configured for signal reception. The vertical and horizontal polarizations represent orthogonal electromagnetic field orientations of the one or more RF signals. The plurality of frequency bands are distinct frequency ranges that spans the radio frequency spectrum. The wireless communication device 104A includes the one or more antenna arrays 204 may include the plurality of dual-polarized antennas 206. The plurality of dual-polarized antennas 206 may include four independent antenna elements forming a 4×4 MIMO configuration. Each antenna element within the plurality of dual-polarized antennas 206 includes orthogonally oriented dipoles or patch radiators. The orthogonally oriented dipoles concurrently receive the one or more RF signals in both vertical and horizontal polarization. The vertical polarization may capture electromagnetic waves with electric field oscillating in the vertical plane. The horizontal polarization may capture electromagnetic waves with electric field oscillating in the horizontal plane. Each antenna element in the plurality of dual-polarized antennas 206 may support two independent polarization modes concurrently. The dual polarization capability may double data communication capacity without increasing bandwidth or frequency usage. The one or more antenna arrays 204 may receive the one or more RF signals across the plurality of frequency bands ranging from DC to 100 GHz. The plurality of frequency bands includes low band frequencies from 50 MHz to 1 GHz, mid band frequencies from 1 GHz to 3 GHz, and high band frequencies from 3 GHz to 100 GHz and above. The one or more antenna arrays 204 may provide 360-degree coverage pattern for omnidirectional signal reception. The four independent antenna elements may operate with different phases at 0 degrees, 90 degrees, 180 degrees, and 270 degrees. The concurrent reception increases signal detection capacity without requiring additional bandwidth.

In accordance with an embodiment, the RF front-end 208 coupled to the one or more antenna arrays 204 may be configured to apply band-specific filtering to the received one or more RF signals to isolate signals-of-interest. The RF frontend further may further include the plurality of different filters 212 for the band-specific filtering of the one or more RF signals for the isolation of the signals-of-interest along with about 50-80 decibels (dB) of spurious signal suppression. In an implementation, the LNA 210 may be placed before pre-filtering stage, as spectrum monitoring may often involve detecting weak or distant signals (e.g., covert transmissions, military radar, low-power IoT devices). Further, to sniff RF signals from the air 202, especially the broad frequency range (e.g., DC-100 GHz), the LNA 210 may ensure that signals across all frequencies are captured with minimal loss before band-specific filtering. The LNA 210 may amplify such weak signals before the signals encounter any filtering losses, improving detection accuracy. In some implementations, the LNA 210 may not be placed before the plurality of different filters 212 to reduce out-of-band interference. The wireless communication device 104A may evaluate spectrum monitoring performance with the LNA 210 positioned before pre-filtering compared to operation without the LNA 210 (e.g., the LNA 210 bypassed) to determine which configuration provides better signal detection accuracy.

In an example, the plurality of different filters 212 may be pre-filters that may process signals across distinct frequency ranges. In such a case, low band filtering may operate from 50 MHz to 1 GHz to eliminate interference from television (TV), frequency modulation (FM) radio stations, and long-term evolution (LTE) signals. The mid band filtering may operate from 1 GHz to 3 GHz to suppress cellular and adjacent Wi-Fi® bands, and high band filtering may operate from 3 GHz to 100 GHz and above to isolate high-frequency signals from 5G, radar, and millimeter wave sources. In an implementation, the RF front-end 208 may employ a multi-stage filtering architecture that may include cavity filters providing high-Q resonance, Surface Acoustic Wave (SAW) filters, and Bulk Acoustic Wave (BAW) filters for precise frequency selectivity. In some implementations, the wireless communication device 104A may implement an adaptive digital filtering operation using DSP-based notch filters after the analog filtering stage, which may improve the overall spurious signal rejection capabilities. Further, the implementation of narrowband bandpass filters may provide selective passing of signals-of-interest while retaining substantial attenuation of unwanted RF signals. The multi-stage spurious suppression techniques may achieve 50-80 dB of rejection. This comprehensive filtering approach may be particularly advantageous in dense RF environments where multiple interfering signals may be present, allowing the system to isolate and monitor specific frequency bands of interest while retaining high signal quality through robust interference suppression.

In accordance with an embodiment, the RF front-end 208 may be further configured to convert and digitize the signals-of-interest to predefined intermediate frequency bands to obtain the RF signal data. The predefined intermediate frequency bands represent predetermined frequency ranges selected for intermediate signal processing before digitization. The RF signal data represents digitized representations of the signals-of-interest at the predefined intermediate frequency bands. The RF front-end 208 employs the mixer 216 and the LO 214 to convert the signals-of-interest to the predefined intermediate frequency bands. The mixer 216 combines the filtered signals-of-interest with a stable frequency generated by the LO 214 to produce sum and difference frequencies. The difference frequency is calculated as RF frequency minus LO frequency produces the desired intermediate frequency. The sum frequency may be discarded through subsequent filtering. The predefined intermediate frequency bands include 2.4 GHz, 5 GHz, 6 GHz, 7 GHz, or an unlicensed or industrial, scientific, or medical (ISM) frequency band. The selection of the predefined intermediate frequency bands ensures compatibility with subsequent digitization hardware including IEEE 802.11be chipset architecture. The down-conversion to the predefined intermediate frequency bands allows the wireless communication device 104A to leverage existing chipset processing capabilities. The RF front-end 208 processes the down-converted intermediate frequency signals through the ADC arrays 226 for digitization. The ADC arrays 226 sample and convert the analog intermediate frequency signals into digital form. The digitization process captures amplitude and phase information of the signals-of-interest at discrete time intervals. The digitized signals at the predefined intermediate frequency bands constitute the RF signal data. The RF signal data obtained from the digitization contains signal characteristics including magnitude, phase, and timing information. The predefined intermediate frequency bands avoid interference from other signals while matching ADC bandwidth and resolution requirements. The down-conversion and digitization approach provide advanced digital signal processing capabilities including real-time filtering, demodulation, and pattern recognition. The RF signal data obtained at the predefined intermediate frequency bands facilitates spectrum monitoring operations requiring signal classification, anomaly detection, and cognitive RF adaptation for interference mitigation. In an example, the ISM frequency band may include frequency ranges such as 902-928 MHz, 2.4-2.5 GHz, or 5.725-5.875 GHz depending on regulatory domain. The selection of two or more intermediate frequency bands allows the wireless communication device 104A to process signals across multiple frequency ranges concurrently.

The processor 230 may be further configured to receive the RF signal data of the one or more RF signals associated with the one or more RF signal sources (e.g., the RF signal sources 106A, 106B, . . . , 106N). The RF signal data may include digitized samples of electromagnetic signals captured from the radio frequency spectrum. The one or more RF signals may correspond to electromagnetic signals captured by the one or more antenna arrays 204. The one or more RF signal sources may include various wireless communication devices generating the one or more RF signals. In an implementation, the processor 230 may receive the RF signal data from the RF front-end 208. The RF signal data may arrive at the processor 230 as digitized down-converted signals in the predefined intermediate frequency bands. In an example, the one or more RF signal sources may include, but are not limited to, Wi-Fi devices, cellular base stations, IoT devices, radars, 5G transmitters, and millimeter-wave communication devices.

The processor 230 may be further configured to generate a plurality of frequency bins from the received RF signal data based on the default resolution mode 110A preset at the wireless communication device 104A. The default resolution mode 110A is associated with the first frequency bin size. Each of the plurality of frequency bins may correspond to frequency intervals that are discrete. The plurality of frequency bins may divide the received RF signal data into segments across the frequency spectrum. The processor 230 may receive the RF signal data from the RF front-end 208 in the time-domain. The processor 230 may apply a sliding window operation on the received RF signal data. The sliding window operation may divide the received RF signal data into segments. The segments may be the divided portions of the continuous data stream of the received RF signal data. The processor 230 may execute the fast Fourier transform (FFT) operation on each of the segments of the received RF signal data. The FFT operation may transform the segments of the received RF signal data in the time-domain to the frequency-domain to generate the plurality of frequency bins. Each frequency bin of the plurality of frequency bins may correspond to a different frequency. The processor 230 may generate the plurality of frequency bins to identify signal amplitude and signal timing of the received RF signal data at the corresponding frequency.

In an implementation, the default resolution mode 110A may correspond to an initial operating mode of the wireless communication device 104A. The processor 230 may access the default resolution mode 110A from the memory 232. The default resolution mode 110A may correspond to the specific subcarrier spacing and the FFT point size. The subcarrier spacing may define the frequency separation between adjacent frequency bins of the plurality of frequency bins. The FFT point size may define the total number of discrete frequency bins generated by the FFT operation. The processor 230 may preset the default resolution mode 110A at the time of initialization of the wireless communication device 104A. As an example, the default resolution mode 110A may include the FFT point size of 1024 and the subcarrier spacing of about 78.125 kHz. The processor 230 may generate 1024 frequency bins when processing a signal bandwidth in the default resolution mode 110A.

In accordance with an embodiment, the processor 230 may be further configured to determine the frequency spacing between the one or more RF signals within the plurality of frequency bins. The frequency spacing may correspond to a difference in the frequencies of the two or more RF signals. The processor 230 may identify frequency bins with the one or more received RF signals within the plurality of frequency bins. Each frequency bin in which the one or more received RF signals are present, may have a frequency location. The frequency location may be the frequency at the center of the frequency bin. The processor 230 may determine the frequency location of each frequency bin of the plurality of frequency bins within which the one or more RF signals are present. The processor 230 may determine the frequency spacing by subtracting the frequency locations of different frequency bins inside which the one or more RF signals are present. In an implementation, the processor 230 may determine the frequency spacing between the two adjacent frequency bins by taking the difference of the frequency locations. The frequency spacing may have units of frequency, such as kHz or megahertz (MHz). The processor 230 may store the value of the frequency spacing within the memory 232. The processor 230 may access the stored value of the frequency spacing for a subsequent comparison operation. In an example, the processor 230 may identify two frequency bins with the one or more RF signals in the plurality of frequency bins. Each of the two frequency bins may have the center frequency location at 5.150000 GHz and 5.150045 GHz. The processor 230 may determine the frequency spacing by subtracting 5.150000 GHz from 5.150045 GHz. The determination may produce the frequency spacing value of 45 kHz.

In accordance with an embodiment, the processor 230 may be further configured to compare the frequency spacing to the frequency bin size selected from: the first frequency bin size of the default resolution mode 110A, the second frequency bin size of the first resolution mode 110B, and the third frequency bin size of the second resolution mode 110C. The determination of each of the first degree of overlap or the second degree of overlap is based on the comparison. The frequency bin size may be associated with the frequency spacing. The frequency bin size may correspond to the width of each of the frequency bins of the plurality of frequency bins. In an implementation, the corresponding frequency bin size may be the first frequency bin size when the default resolution mode 110A is active. The corresponding frequency bin size may be the second frequency bin size if the first resolution mode 110B is active. The corresponding frequency bin size may be the third frequency bin size if the second resolution mode 110C is active. The processor 230 may retrieve the frequency spacing value and the corresponding frequency bin size from the memory 232. The processor 230 may calculate the degree of overlap according to the formula: degree of overlap=(frequency bin size−frequency spacing). The degree of overlap is a quantitative measure that indicates the extent to which the frequency spacing between RF signals compares to the frequency bin size of the current resolution mode. A negative degree of overlap may indicate that the frequency spacing is greater than the corresponding frequency bin size. The negative difference value may further indicate no overlap exists between the one or more received RF signals. A positive difference value may indicate the frequency spacing is less than the corresponding frequency bin size. The positive difference value may further indicate that overlap exists between the one or more received RF signals. The processor 230 may determine the magnitude of the positive difference value to determine the degree of overlap. The processor 230 may retrieve a threshold value stored in the memory 232. The threshold value may represent the predefined difference value to categorize the degree of overlap. The processor 230 may determine the first degree of overlap based on the degree of overlap being less than the threshold value. The processor 230 may activate the first resolution mode 110B associated with the first degree of overlap. The processor 230 may determine the second degree of overlap based on the degree of overlap being greater than the threshold value. The processor 230 may activate the second resolution mode 110C associated with the second degree of overlap.

By way of example, and not by limitation, the processor 230 determines the degree of overlap according to the formula: degree of overlap=(frequency bin size-frequency spacing). The frequency spacing represents the separation between adjacent RF signals or between multiple RF signals in the frequency domain. The frequency bin size represents the width of each frequency bin generated by the FFT processing in the current resolution mode. The comparison between these two values reveals whether the signals occupy distinct frequency bins or overlapping frequency bins. A negative degree of overlap indicates that the frequency spacing is greater than the corresponding frequency bin size. The negative difference value indicates that no overlap exists between the received RF signals. The signals occupy distinct frequency bins and can be adequately discriminated at the current resolution. In such a condition, the processor 230 may assign a first complexity level (e.g., a low complexity level) to the received RF signal data and maintain operation in the current resolution mode. Alternatively, if currently operating in a finer resolution mode, such as the first resolution mode 110B or the second resolution mode 110C, the processor 230 may transition back to a coarser resolution mode to reduce computational load while maintaining adequate signal discrimination. A positive degree of overlap indicates that the frequency spacing is less than the corresponding frequency bin size. The positive difference value indicates that overlap exists between the received RF signals. The signals occupy overlapping frequency bins and cannot be adequately discriminated at the current resolution. The magnitude of the positive degree of overlap indicates the severity of the overlap condition. A first degree of overlap occurs when the frequency spacing is less than the default frequency bin size but greater than or equal to the frequency bin size of the first resolution mode 110B. The first degree of overlap indicates that transition to the first resolution mode 110B will provide adequate discrimination. The processor 230 assigns a second complexity level (medium complexity) and transitions to the first resolution mode 110B. A second degree of overlap occurs when the frequency spacing is less than the frequency bin size of the first resolution mode 110B but greater than or equal to the frequency bin size of the second resolution mode 110C. The second degree of overlap indicates that the second resolution mode 110C may be required for adequate discrimination. The processor 230 may assign the third complexity level (comparatively high complexity) and transitions to the second resolution mode 110C. By quantifying the degree of overlap, the processor 230 selects the appropriate target resolution mode that provides adaptive frequency bin granularity to resolve the closely spaced signals without applying unnecessarily fine resolution.

In accordance with an embodiment, the second frequency bin size of the first resolution mode 110B is less than the first frequency bin size of the default resolution mode 110A, and the third frequency bin size of the second resolution mode 110C is less than the second frequency bin size of the first resolution mode 110B. The first resolution mode 110B may provide finer frequency resolution compared to the default resolution mode 110A. The processor 230 in the first resolution mode 110B may distinguish the RF signals that may not be separated using the first frequency bin size of the default resolution mode 110A. The processor 230 in the second resolution mode 110C may distinguish the one or more received RF signals that may not be separated using the second frequency bin size of the first resolution mode 110B. As an example, the second frequency bin size of the first resolution mode 110B may be about 39.0625 kHz defined in the memory 232. The second frequency bin size of about 39.0625 kHz may provide finer frequency spacing between adjacent frequency bins compared to the first frequency bin size of about 78.125 kHz in the default resolution mode 110A. Similarly, the third frequency bin size of the second resolution mode 110C may be about 19.53125 kHz defined in the memory 232. The third frequency bin size of about 19.53125 kHz may provide the finer frequency spacing than the second frequency bin size of the first resolution mode 110B.

The processor 230 may be further configured to determine that the one or more RF signals are present in one of overlapping frequency bins or distinct frequency bins within the plurality of frequency bins. The determination is based on a comparison between the frequency spacing of the RF signals and the frequency bin size of the current resolution mode. The processor 230 may retrieve the frequency bin size associated with the current resolution mode from the memory 232. The processor 230 may determine a frequency spacing between the one or more RF signals. The processor 230 may compare the frequency spacing to the frequency bin size. When the frequency spacing is less than or equal to the frequency bin size, the processor 230 determines that the RF signals are present in distinct frequency bins and that the RF signals occupy separate frequency bins and may be discriminated against in the current resolution mode. When the frequency spacing is greater than the frequency bin size, the processor 230 determines that the RF signals are present in overlapping frequency bins. The RF signals occupy the same frequency bin or adjacent frequency bins and cannot be discriminated against in the current resolution mode. The processor 230 may transition to a finer resolution mode (such as the second resolution mode 110C) having a smaller frequency bin size to enable discrimination of the RF signals.

In an example, the processor 230 may generate the plurality of frequency bins in the default resolution mode 110A with each frequency bin size of 78.125 kHz. The processor 230 may identify two frequency bins at the frequency locations 5.150 GHz and 5.150085 GHz. The processor 230 may determine the frequency spacing between the identified bins as 85 kHz by subtracting 5.150 GHz from 5.150085 GHz. The processor 230 may retrieve the current frequency bin size of 78.125 kHz in the default resolution mode 110A from the memory 232. The processor 230 may compare the 85 kHz frequency spacing to the 78.125 KHz frequency bin size. Since 85 kHz is greater than 78.125 kHz, the processor 230 may determine that the two RF signals are present in the distinct frequency bins. In a different scenario, the processor 230 may identify two frequency bins at 5.150 GHz and 5.150045 GHz. The processor 230 may calculate the frequency spacing as 45 kHz. The processor 230 may compare 45 kHz to the 78.125 KHz frequency bin size. Since 45 kHz is less than 78.125 kHz, the processor 230 may determine that the two RF signals may be present in overlapping frequency bins.

In an alternate embodiment, the processor 230 may determine whether the one or more RF signals are present in the overlapping frequency bins or the distinct frequency bins based on a magnitude value of the one or more RF signals present within the plurality of frequency bins. The magnitude value may include the amplitude of the one or more received RF signals present in the corresponding frequency bin. The processor 230 may compare each magnitude value of the one or more received RF signals to a threshold amplitude value stored in the memory 232. The threshold amplitude value may define the minimum signal strength considered as detectable. The processor 230 may identify the frequency bins having the magnitude values exceeding the threshold amplitude value as active frequency bins. The active frequency bins may correspond to the frequency bins with RF signals that may be detectable. The processor 230 may detect the amplitude distribution across a frequency range covered by each active frequency bin. The received RF signal may produce a concentrated amplitude peak within the frequency bin. Multiple RF signals in the same frequency bin may produce multiple amplitude peaks. The processor 230 may detect irregular amplitude patterns that may include multiple local maxima, an asymmetric amplitude distribution, or an elevated baseline amplitude across the width of the frequency bin. The presence of the irregular amplitude patterns may indicate that multiple RF signals from the one or more received RF signals are present in overlapping frequency bins. The processor 230 may store the result of the determination of the one or more RF signals present in the overlapping or the distinct frequency bins in the memory 232.

The processor 230 may be further configured to assign the complexity level to the received RF signal data based on the determination that the one or more RF signals are present in one of the overlapping frequency bins or the distinct frequency bins. The complexity level may represent complexity in the received RF signal data. The complexity level may indicate the frequency separation of the one or more received RF signals within the plurality of frequency bins. As an example, the complexity level may be a categorical or classification value that represents the relationship between the frequency spacing of the RF signals and the frequency bin size of the current resolution mode. The assigned complexity level determines whether to maintain the current resolution mode or transition to one of the finer resolution modes to achieve discrimination of the RF signals. The processor 230 may assign the complexity level based on whether the one or more received RF signals are present in the distinct frequency bins and the degree of overlap. The processor 230 may assign a different complexity level if the received RF signals are present in the same or adjacent overlapping frequency bins. The processor 230 may store the value of the complexity level assigned to the one or more received RF signals in the memory 232. The value of the complexity level stored in the memory 232 may be accessible for adaptive frequency resolution operations.

In accordance with an embodiment, for the assignment of the complexity level, the processor 230 may be further configured to determine the complexity level as a first complexity level based on the one or more RF signals present in the distinct frequency bins. The first complexity level may indicate that the one or more RF signals are present in the separate frequency bins. The processor 230 determines that the RF signals are present in the distinct frequency bins based on the comparison between the frequency spacing and the frequency bin size indicating that the frequency spacing is greater than the frequency bin size. The first complexity level represents a signal condition where the current resolution mode provides adequate frequency discrimination capability for the RF signals. The processor 230 may assign a first complexity level value (such as a numeric value or categorical label) and store the assigned value in the memory 232. When the first complexity level is assigned, the processor 230 may maintain operation in the current resolution mode. For example, if the frequency spacing is 100 kHz and the frequency bin size is 78.125 kHz, the frequency spacing exceeds the frequency bin size, and the processor 230 assigns the first complexity level. The first complexity level may be represented as a numeric value (e.g., "1"), a categorical label (e.g., "LOW"), or an enumerated type. The assignment of the first complexity level indicates that the current resolution mode provides adequate discrimination, and the processor 230 may maintain the current resolution mode. The processor 230 may store the determined first complexity level value in the memory 232.

In accordance with an embodiment, for the assignment of the complexity level, the processor 230 may be further configured to determine the complexity level as a second complexity level higher than the first complexity level based on the one or more RF signals present with the first degree of overlap in the overlapping frequency bins. The processor 230 may determine that more than one received RF signals may be present in the overlapping frequency bins. The processor 230 may retrieve the value of the degree of overlap from the memory 232. The processor 230 may determine the complexity level as the second complexity level when the degree of overlap is the first degree of overlap. The first degree of overlap may be determined when the frequency spacing is less than the frequency bin size of the default resolution mode 110A but greater than or equal to the frequency bin size of the first resolution mode 110B, indicating that the first resolution mode 110B can adequately discriminate the RF signals. For example, with a default mode bin size of 78.125 kHz, a first resolution mode bin size of 39.0625 kHz, and a measured frequency spacing of 50 kHz, the processor 230 determines the first degree of overlap and assigns the second complexity level. The second complexity level may indicate that the one or more received RF signals require finer frequency resolution. The RF signals received may not be distinguishable in the default resolution mode 110A. The processor 230 may store the value of the second complexity level in the memory 232. The processor 230 may transition to the first resolution mode 110B based on the second complexity level to provide finer frequency resolution for distinguishing overlapping signals.

In accordance with an embodiment, for the assignment of the complexity level, the processor 230 may be further configured to determine the complexity level as a third complexity level higher than the second complexity level based on the one or more RF signals present with the second degree of overlap in the overlapping frequency bins. The third complexity level may indicate that finer frequency resolution than that associated with the second complexity level may be required. The processor 230 may retrieve the value of the degree of overlap from the memory 232. The one or more received RF signals may be present in the distinct frequency bins or the overlapping frequency bins based on the degree of overlap. The processor 230 may determine the complexity level as the third complexity level based on the degree of overlap being the second degree of overlap. The second degree of overlap may be determined when the frequency spacing is less than the frequency bin size of the first resolution mode 110B but greater than or equal to the frequency bin size of the second resolution mode 110C, indicating that the second resolution mode 110C is required to adequately discriminate the RF signals. For example, with a first resolution mode bin size of 39.0625 kHz, a second resolution mode bin size of 19.53125 kHz, and a measured frequency spacing of 25 kHz, the processor 230 determines a second degree of overlap exists and assigns the third complexity level, triggering transition to the second resolution mode 110C. The processor 230 may store the value of the third complexity level determined for the one or more RF signals in the memory 232. The processor 230 may further transition to the second resolution mode 110C based on the third complexity level. The second resolution mode 110C may provide finer frequency resolution for distinguishing the RF signals than the first resolution mode 110B.

As an example, Table 1 illustrates the relationship between assigned complexity levels and the corresponding resolution modes selected based on frequency spacing conditions. The first complexity level may be assigned when the frequency spacing exceeds the default mode bin size of 78.125 kHz, indicating that RF signals occupy distinct frequency bins and the default resolution mode 110A provides adequate discrimination. The second complexity level is assigned when the frequency spacing falls between 78.125 kHz and 39.0625 kHz, representing a first degree of overlap that requires transition to the first resolution mode 110B for adequate discrimination. The third complexity level is assigned when the frequency spacing falls between 39.0625 kHz and 19.53125 kHz, representing a second degree of overlap that requires transition to the second resolution mode 110C with the finest frequency resolution.

| Complexity Level | Frequency Spacing Condition | Example | Resolution Mode |
|---|---|---|---|
| First | Spacing > 78.125 kHz (Default bin size) | 100 kHz | Default resolution mode 110A (e.g., 78.125 kHz bins) |
| Second | 78.125 kHz > Spacing ≥ 39.0625 kHz | 50 kHz | First resolution mode 110B (e.g., 39.0625 kHz bins) |
| Third | 39.0625 kHz > Spacing ≥ 19.53125 kHz | 25 kHz | Second resolution mode 110C (e.g., 19.53125 kHz bins) |

Table 1: Relationship Between Complexity Levels and Resolution Modes

In an implementation, the processor 230 may determine resolution mode transitions based on the assigned complexity level. The processor 230 may continue adaptive frequency resolution operations in the default resolution mode 110A when the assigned complexity level is the first complexity level. The processor 230 may transition from the default resolution mode 110A to the first resolution mode 110B when the assigned complexity level is the second complexity level. The processor 230 may transition from the first resolution mode 110B to the second resolution mode 110C when the assigned complexity level is the third complexity level. The processor 230 may retrieve the corresponding resolution modes (e.g., the default resolution mode 110A, the first resolution mode 110B, or the second resolution mode 110C) from the memory 232 for transition from one of the resolution modes.

The processor 230 may be configured to transition from the default resolution mode 110A to one of the first resolution mode 110B or the second resolution mode 110C based on the assigned complexity level. The first resolution mode 110B is associated with the second frequency bin size different from the first frequency bin size, and the second resolution mode 110C is associated with the third frequency bin size different from the first frequency bin size and the second frequency bin size. The transition may refer to the change in the state of operation of the processor 230 from the default resolution mode 110A to the one of the first resolution mode 110B or the second resolution mode 110C. The processor 230 may determine the resolution mode for the transition based on the assigned complexity level. The processor 230 may retrieve the assigned complexity level from the memory 232. The assigned complexity level may correspond to one of the first complexity level, the second complexity level, or the third complexity level. The processor 230 may remain in the default resolution mode 110A if the assigned complexity level corresponds to the first complexity level. The processor 230 may transition to the first resolution mode 110B if the assigned complexity level corresponds to the second complexity level. The processor 230 may transition to the second resolution mode 110C if the assigned complexity level corresponds to the third complexity level. The processor 230 may operate in different resolution modes different from default resolution mode 110A to provide finer frequency resolution. In an example, the processor 230 may operate in the default resolution mode 110A with the first frequency bin size of 78.125 kHz. The processor 230 may retrieve the assigned complexity level from the memory 232. The assigned complexity level may correspond to the second complexity level. The second complexity level may correspond to the first resolution mode 110B. The processor 230 may transition from the default resolution mode 110A to the first resolution mode 110B. In a similar manner, the processor 230 may transition to the second resolution mode 110C if the assigned complexity level may correspond to the third complexity level.

In accordance with an embodiment, the processor 230 may be further configured to adjust the subcarrier spacing parameter associated with the first frequency bin size for the transition from the default resolution mode 110A to one of the first resolution mode 110B or the second resolution mode 110C. The first frequency bin size may be the size of each frequency bin associated with the frequency spacing of each frequency bin of the plurality of frequency bins in the default resolution mode 110A. The processor 230 may transition from the default resolution mode 110A to one of the first resolution mode 110B or the second resolution mode 110C by adjusting the subcarrier spacing parameter. In an implementation, the first frequency bin size of about 78.125 kHz may be associated with the subcarrier spacing parameter in the default resolution mode 110A. The processor 230 may retrieve the subcarrier spacing parameter value (e.g., 78.125 kHz) predefined for the default resolution mode 110A from the memory 232. Based on the accessed subcarrier spacing parameter, the processor 230 may generate the plurality of frequency bins of the first frequency bin size for the default resolution mode 110A. In a similar manner, the processor 230 may further generate the plurality of frequency bins of the second frequency bin size and the third frequency bin size to transition to one of the first resolution mode 110B or the second resolution mode 110C.

In accordance with an embodiment, the processor 230 may be further configured to update the plurality of frequency bins based on the subcarrier spacing parameter. The update of the plurality of frequency bins may include a process of generating a new plurality of frequency bins to replace a previously generated plurality of frequency bins. The previously generated plurality of frequency bins may correspond to the frequency bins generated in the default resolution mode 110A before the transition to a different resolution mode. The processor 230 may retrieve from the memory 232, the subcarrier spacing associated with one of the resolution modes based on the assigned complexity level. The processor 230 may transition to the resolution mode with the retrieved subcarrier spacing associated with the assigned complexity level. The subcarrier spacing may be associated with one of the first resolution mode 110B or the second resolution mode 110C. The subcarrier spacing may include a new frequency bin size associated with each of the frequency bins of the new plurality of frequency bins. The new frequency bin size may be different from the previously generated frequency bin size of each frequency bin of the plurality of frequency bins in the default resolution mode 110A. The processor 230 may update the plurality of frequency bins in the default resolution mode 110A to the new frequency bins to perform a frequency analysis of the received RF signal data at a different resolution. The frequency analysis may correspond to distinguishing the received RF signals distributed across different frequencies within the received RF signal data. The resolution may refer to frequency resolution, which is the minimum frequency separation between the frequency bins where the processor 230 may distinguish two RF signals as distinct signals. The processor 230 may distinguish received RF signals with smaller frequency separation at higher frequency resolution. The processor 230 may distinguish received RF signals with larger frequency separation at lower frequency resolution. The processor 230 may update the plurality of frequency bins for one of the first resolution mode 110B or the second resolution mode 110C in a similar manner as the plurality of frequency bins generated in the default resolution mode 110A. In an example, the processor 230 may retrieve the subcarrier spacing parameter (e.g., 39.0625 kHz) associated with the first resolution mode 110B. The processor 230 may update the plurality of frequency bins based on the subcarrier spacing parameter and the FFT point size accessed from the memory 232 for the first resolution mode 110B. The updated plurality of frequency bins may include 2048 frequency bins. Each frequency bin of the plurality of frequency bins may have the frequency bin size of 39.0625 kHz smaller than the frequency bin size associated with the default resolution mode 110A to provide finer frequency resolution.

In accordance with an embodiment, the processor 230 may be further configured to reallocate processing resources proportionate to a computational load associated with one of the first resolution mode 110B or the second resolution mode 110C. The reallocation of the processing resources may be based on the update of the plurality of frequency bins. The processing resources may be computational capabilities available at the processor 230 for executing the adaptive frequency resolution operations. The processing resources may include but are not limited to memory 232 allocation, processing time, and clock cycle. The computational load may be the amount of processing work required to execute operations in one of the first resolution mode 110B or the second resolution mode 110C. The computational load may depend on the FFT point size of the resolution mode. A larger FFT point size (i.e., the FFT point size greater than a threshold) may require higher computational load. In an implementation, the first resolution mode 110B may employ operations with FFT point size of 2048, while the second resolution mode 110C may employ operations with FFT point size of 4096 with a subcarrier spacing value of 19.53125 kHz. The processor 230 may reallocate the processing resources after transitioning to one of the first resolution mode 110B or the second resolution mode 110C. At the time of the transition to the first resolution mode 110B, the processor 230 may update the plurality of frequency bins of the first frequency bin size associated with the default resolution mode 110A to the plurality of frequency bins of the second frequency bin size associated with the first resolution mode 110B. The processor 230 may retrieve the FFT point size for the resolution mode currently active from the memory 232 (e.g., the FFT point size associated with the first resolution mode 110B). The processor 230 may determine the computational load based on the FFT point size associated with the first resolution mode 110B. The processor 230 may determine the required processing resources based on the determined computational load. The processor 230 may adjust the memory 232 allocation to accommodate the computational load. The processor 230 may increase the buffer size of the memory 232 (e.g., from 4 megabytes to 8 megabytes) at the time of transitioning to the first resolution mode 110B. The increased buffer size of the memory 232 stores larger FFT outputs. The processor 230 may adjust the allocation of processing time to match the computational load. The increase in processing time may provide the time for computations for larger FFT point size. In a similar manner, the processor 230 may further reallocate the processing resources at the time of transition from the first resolution mode 110B to the second resolution mode 110C.

In accordance with an embodiment, the processor 230 may be further configured to associate subcarriers of the plurality of frequency bins to the one or more RF signals based on the transition to the different frequency bin size of one of the first resolution mode 110B or the second resolution mode 110C. Each subcarrier may correspond to a discrete frequency interval within the updated plurality of frequency bins. The processor 230 may perform the association of the subcarriers with the one or more RF signals by determining which subcarriers may include the one or more RF signals. The processor 230 may link the determined subcarriers with the corresponding RF signals based on the transition to the different frequency bin size of one of the first resolution mode 110B or the second resolution mode 110C. The processor 230 may identify the subcarriers that may have the one or more RF signals based on the frequency locations of the one or more RF signals within the updated plurality of frequency bins. The processor 230 may associate the subcarriers at each frequency location with the corresponding RF signal at the determined frequency location. The association may be based on the transition to the different frequency bin size. The different frequency bin size may provide different frequency spacing between subcarriers than the first frequency bin size. Each subcarrier within the updated plurality of frequency bins after transition may cover a narrower frequency range than the frequency bins in the default resolution mode 110A. The narrower frequency range may allow the processor 230 to separate the RF signals that may previously occupied the same frequency bin. In an example, the processor 230 may transition to the first resolution mode 110B with the second frequency bin size of 39.0625 kHz. The processor 230 may regenerate the plurality of frequency bins with 2048 subcarriers. The processor 230 may determine that certain subcarriers at 5.150 GHz include a first RF signal. The processor 230 may determine that the certain subcarriers at 5.195 GHz include a second RF signal. The processor 230 may associate the subcarriers at 5.150 GHz with the first RF signal. The processor 230 may associate the subcarriers at 5.195 GHz with the second RF signal. The processor 230 may store the associations in the memory 232.

In accordance with an embodiment, the processor 230 may be further configured to allocate bandwidth to each of the subcarriers based on signal characteristics of the one or more RF signals. The bandwidth may define the frequency range that the subcarrier may use for the frequency resolution of the associated RF signal. The signal characteristics may include the measurable properties of the one or more RF signals. As an example, the signal characteristics may include signal amplitude, phase, and bandwidth. The processor 230 may allocate the bandwidth to each of the subcarriers based on the signal characteristics. The processor 230 may analyze the signal characteristics to determine the bandwidth requirements. Different signal characteristics may require different bandwidth allocations. The processor 230 may store the value of the bandwidth allocation within the memory 232. The stored value of the bandwidth allocation may improve the processing of the RF signals in each subcarrier by the processor 230. In an example, the processor 230 may associate subcarriers at 5.150 GHz to a first RF signal. The processor 230 may analyze the signal characteristics indicating the first RF signal has 20 MHz signal bandwidth. The processor 230 may allocate 20 MHz bandwidth to the associated subcarriers. The processor 230 may store the value of the allocated bandwidth (i.e., 20 MHz) in the memory 232.

In accordance with an embodiment, the processor 230 may be further configured to monitor signal characteristics of the one or more RF signals. The signal characteristics may be selected from the group consisting of a frequency spacing value that indicates the extent of spacing between the one or more RF signals within the plurality of frequency bins, the bandwidth of each of the one or more RF signals, and a signal-to-noise ratio (SNR) of each of the one or more RF signals. The SNR of each RF signal represents a ratio comparing signal power to noise power. The SNR may indicate signal quality. A higher SNR indicates better signal quality. The processor 230 may monitor the one or more RF signals periodically by measuring the signal characteristics. The processor 230 may read the magnitude and phase values of the signals from the plurality of frequency bins. The processor 230 may calculate the frequency spacing value by determining frequency locations of the one or more RF signals and computing differences between the frequency locations. The processor 230 may calculate the bandwidth by measuring the frequency range occupied by each RF signal. The processor 230 may calculate the SNR by comparing signal power in frequency bins including the RF signals to noise power in frequency bins without RF signals. The processor 230 may store the measured signal characteristics in the memory 232. The processor 230 may repeat the measurement of the signal characteristics at regular time intervals to detect changes in the signal characteristics over time. The processor 230 may determine whether to retain the current resolution mode or transition to the different resolution mode based on the monitored signal characteristics.

In accordance with an embodiment, the processor 230 may be further configured to switch among the default resolution mode 110A, the first resolution mode 110B, and the second resolution mode 110C within a threshold time based on a change in the monitored signal characteristics of the one or more RF signals. The processor 230 may transition from the default resolution mode 110A to the first resolution mode 110B or the second resolution mode 110C. The processor 230 may transition from the first resolution mode 110B to the default resolution mode 110A or the second resolution mode 110C. The processor 230 may transition from the second resolution mode 110C to the first resolution mode 110B or the default resolution mode 110A. In an implementation, the threshold time may be the maximum time duration allowed for completion of the switching operation among the resolution modes. The change in the monitored signal characteristics may be the difference detected between current signal characteristics and the previous signal characteristics. The previous signal characteristics may be stored in the memory 232. The processor 230 may perform the switching based on the difference between the signal characteristics. The processor 230 may determine that a change in the signal characteristics has occurred based on the difference that may exceed a change threshold. The change threshold may be a minimum difference value for the signal characteristics stored in the memory 232. The processor 230 may evaluate which resolution mode may be appropriate for the change in the signal characteristics. The processor 230 may select a target resolution mode different from the current resolution mode. The processor 230 may record the start time of the switching operation. The processor 230 may retrieve the resolution modes (e.g., the default resolution mode 110A, the first resolution mode 110B, or the second resolution mode 110C) for the target resolution mode from the memory 232. The processor 230 may transition to the target resolution mode from one of the resolution modes retrieved from the memory 232. The processor 230 may record the completion time of the switching operation. The processor 230 may determine the elapsed time by subtracting the start time from the completion time. The processor 230 may compare the elapsed time to the threshold time. The switching operation meets the timing requirement based on the elapsed time being less than or equal to the threshold time. The switching within the threshold time may provide rapid adaptation to changing signal conditions.

In accordance with an embodiment, the processor 230 may be further configured to re-transition from one of the first resolution mode 110B or the second resolution mode 110C to the default resolution mode 110A based on the frequency spacing value that is greater than the first frequency bin size of the default resolution mode 110A. The processor 230 may perform the re-transition based on the frequency spacing value. The frequency spacing value may indicate adequate signal separation exists for the frequency resolution of the RF signals in the default resolution mode 110A. The processor 230 may compare the frequency spacing value to the first frequency bin size. The processor 230 may determine that the one or more RF signals may have adequate frequency separation for the default resolution mode 110A. The determination may be based on the frequency spacing value being greater than the first frequency bin size. The determined frequency spacing may indicate that the RF signals no longer require the finer frequency resolution associated with the first resolution mode 110B or the second resolution mode 110C. The processor 230 may re-transition to the default resolution mode stored in the memory 232. The default resolution mode 110A may correspond to the first frequency bin size of 78.125 kHz and the FFT point size of 1024. The processor 230 may rewrite the subcarrier spacing and the FFT-point size in the memory 232 to re-transition to the default resolution mode 110A. The re-transition to the default resolution mode 110A may reduce the computational load.

In accordance with an embodiment, the processor 230 may be further configured to determine the SNR in one of the first resolution mode 110B or the second resolution mode 110C. The processor 230 may perform the determination to evaluate signal quality in the resolution mode that is currently active. In an implementation, the processor 230 may analyze the plurality of frequency bins to measure the signal power and the noise power. The processor 230 may identify frequency bins with the one or more RF signals. The processor 230 may determine signal power by summing magnitude values in the frequency bins with RF signals. The processor 230 may identify frequency bins without the RF signals. The frequency bins without the RF signals represents noise. The processor 230 may determine noise power by summing magnitude values in the frequency bins without RF signals. The processor 230 may determine the SNR by dividing the signal power by the noise power. The processor 230 may convert the SNR to decibel units by applying logarithmic transformation. The SNR in decibels may equal ten times the logarithm base ten of the ratio value. The processor 230 may store the determined SNR value in the memory 232. The processor 230 may utilize the stored SNR value for resolution mode selection operations. In an example, the processor 230 may operate in the first resolution mode 110B with 2048 frequency bins. The processor 230 may identify frequency bins at 5.150 GHz containing a first RF signal. The processor 230 may calculate signal power as 100 milliwatts from the identified frequency bins. The processor 230 may identify frequency bins without RF signals. The processor 230 may calculate noise power as 1 milliwatt from the frequency bins without RF signals. The processor 230 may divide one hundred milliwatts by one milliwatt to obtain the ratio value of one hundred. The processor 230 may calculate ten times the logarithm base ten of one hundred. The calculation may produce a SNR of 20 decibels. The processor 230 may store the 20-decibel value in the memory 232.

In accordance with an embodiment, the processor 230 may be further configured to transition to a different resolution mode from among the default resolution mode 110A, the first resolution mode 110B, or the second resolution mode 110C based on a combination of the assigned complexity level, one or more defined SNR thresholds, and the determined SNR. The assigned complexity level may be the complexity level value previously assigned to the received RF signal data. The one or more defined SNR thresholds may be the predetermined SNR values stored in the memory 232. The one or more defined SNR thresholds may establish minimum signal quality requirements for each resolution mode. The determined SNR may be the SNR value previously calculated in the first resolution mode 110B or the second resolution mode 110C. The processor 230 may retrieve the assigned complexity level from the memory 232. The processor 230 may retrieve the one or more defined SNR thresholds from the memory 232. Each resolution mode may have an associated SNR threshold. A first SNR threshold may correspond to the default resolution mode 110A. A second SNR threshold may correspond to the first resolution mode 110B. A third SNR threshold may correspond to the second resolution mode 110C. The processor 230 may retrieve the determined SNR from the memory 232. The processor 230 may evaluate the assigned complexity level to identify candidate resolution modes. The processor 230 may select the default resolution mode 110A based on the assigned complexity level being the first complexity level. The processor 230 may select the first resolution mode 110B based on the assigned complexity level being the second complexity level. The processor 230 may select the second resolution mode 110C based on the assigned complexity level being the third complexity level. The processor 230 may evaluate whether the determined SNR meets the SNR threshold for the candidate resolution mode. The processor 230 may compare the determined SNR to the SNR threshold associated with the candidate resolution mode. The processor 230 may select the associated resolution mode based on the determined SNR being greater than or equal to the SNR threshold. The processor 230 may select a different resolution mode with lower computational requirements based on the determined SNR being less than the SNR threshold.

In an example, the processor 230 may retrieve the assigned complexity level from the memory 232. The assigned complexity level may be the third complexity level. The processor 230 may identify the second resolution mode 110C based on the third complexity level. The processor 230 may retrieve the third SNR threshold of 15 decibels for the second resolution mode 110C. The processor 230 may retrieve the determined SNR of 12 decibels from the memory 232. The processor 230 may compare 12 decibels to 15 decibels. Since 12 decibels is less than 15 decibels, the determined SNR may not meet the threshold. The signal quality may not meet requirements for the second resolution mode 110C. The processor 230 may evaluate the first resolution mode 110B as an alternative. The processor 230 may retrieve the second SNR threshold of 10 decibels for the first resolution mode 110B. The processor 230 may compare 12 decibels to 10 decibels. Since 12 decibels exceed 10 decibels, the determined SNR meets the threshold for the first resolution mode 110B. The processor 230 may select the first resolution mode 110B based on the combination of the third complexity level, the one or more defined SNR thresholds, and the determined SNR of 12 decibels. The processor 230 may select and store the first resolution mode 110B in the memory 232.

Figure 3A:
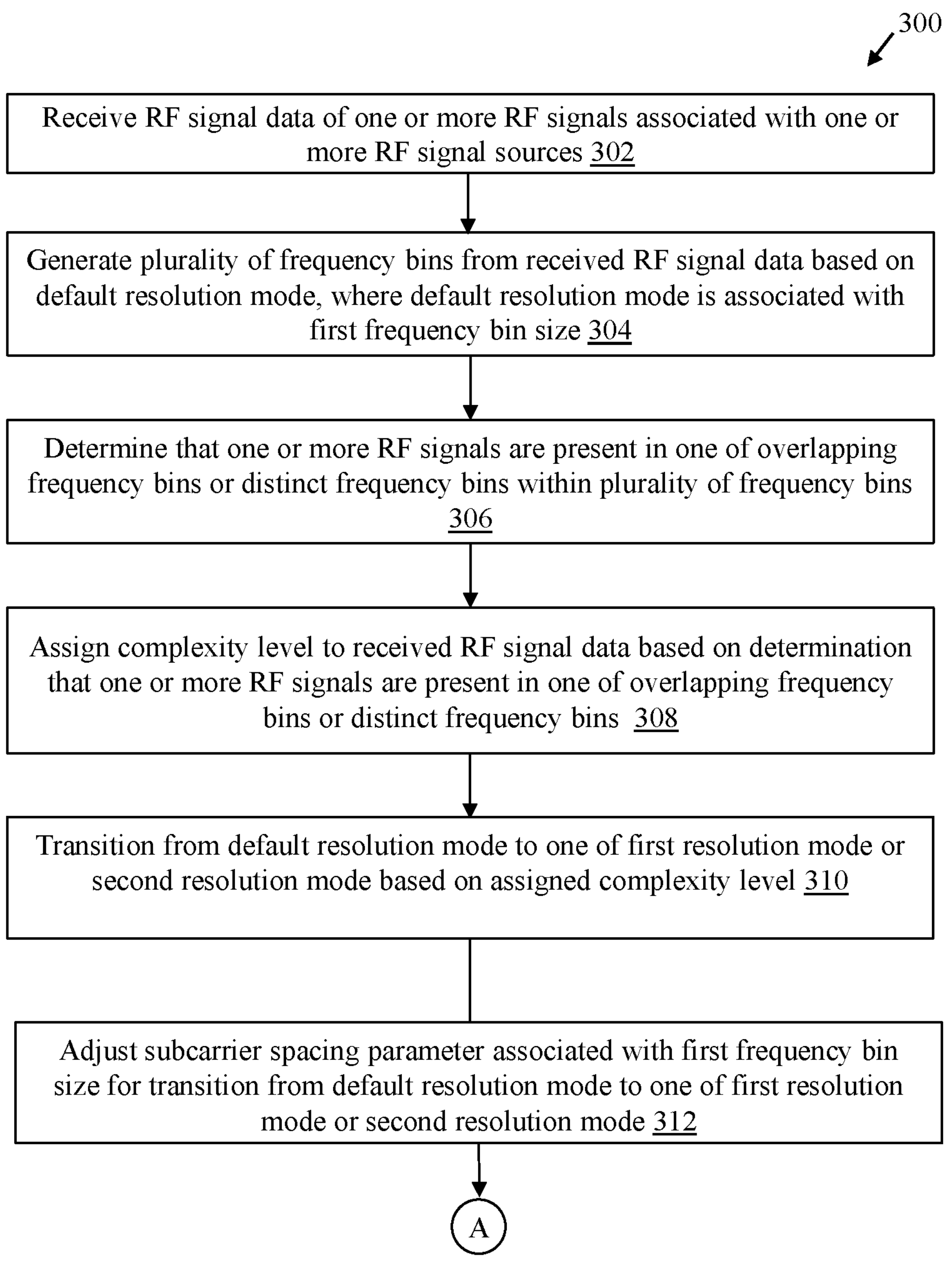
FIG. 3A and FIG. 3B are diagrams that illustrate a flowchart of a method for adaptive frequency resolution based on signal complexity, in accordance with an embodiment of the disclosure.
Figure 3B:
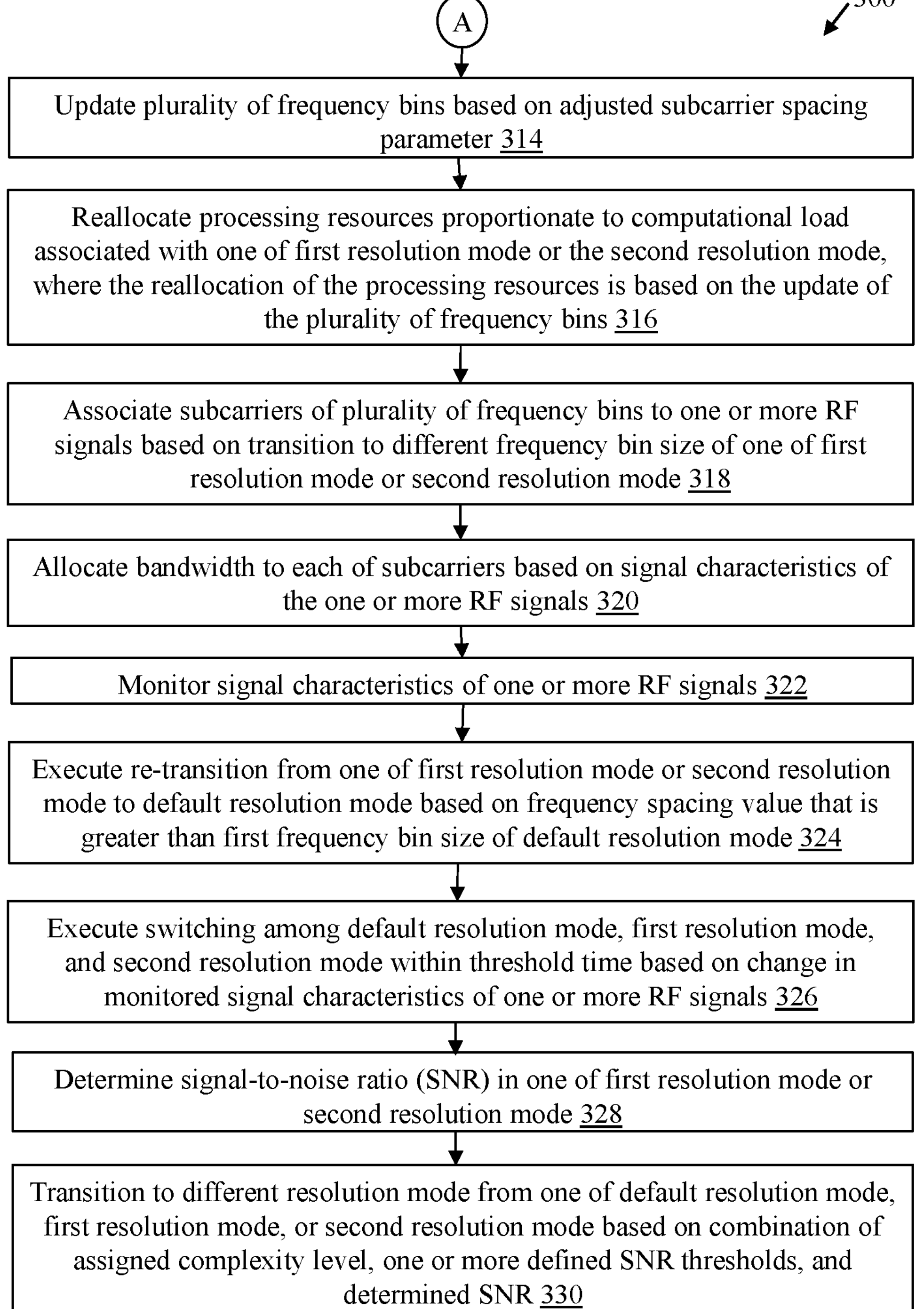

FIG. 3A and FIG. 3B are diagrams that illustrate a flowchart of a method for adaptive frequency resolution based on signal complexity, in accordance with an embodiment of the disclosure. FIG. 3A and FIG. 3B are explained in conjunction with elements from FIG. 1 and FIG. 2. With reference to FIG. 3A and FIG. 3B, there is shown a flowchart 300 of a set of operations 302 through 330. The flowchart 300 reciting the set of operations 302 may be implemented in any of the wireless communication devices 104A, 104B, 104C, . . . , 104N. With reference to FIG. 3A, operations 302 to 312 are shown.

At operation 302, RF signal data of one or more RF signals associated with the one or more RF signal sources (e.g., the RF signal sources 106A, 106B, . . . , 106N) may be received. The one or more antenna arrays 204 may be configured to receive the one or more RF signals in vertical and horizontal polarizations across a plurality of frequency bands. The RF front-end 208 may be configured to apply band-specific filtering to the received one or more RF signals to isolate signals-of-interest. The RF front-end 208 may be configured to convert and digitize the signals-of-interest to predefined intermediate frequency bands to obtain the RF signal data. The predefined intermediate frequency bands correspond to two or more of 2.4 gigahertz (GHz), 5 GHz, 6 GHz, 7 GHz, or an unlicensed or industrial, scientific, or medical (ISM) frequency band.

At operation 304, the plurality of frequency bins may be generated from the received RF signal data based on the default resolution mode 110A. The default resolution mode 110A may be associated with the first frequency bin size.

At operation 306, it may be determined that the one or more RF signals are present in one of overlapping frequency bins or distinct frequency bins within the plurality of frequency bins.

At operation 308, a complexity level may be assigned to the received RF signal data based on the determination that the one or more RF signals are present in one of the overlapping frequency bins or the distinct frequency bins. In an implementation. The operation 308 may include one or more sub-operations. The complexity level may be determined as a first complexity level based on the one or more RF signals present in the distinct frequency bins. The complexity level may be determined as a second complexity level higher than the first complexity level based on the one or more RF signals present with a first degree of overlap in the overlapping frequency bins. The complexity level may be determined as a third complexity level higher than the second complexity level based on the one or more RF signals present with a second degree of overlap in the overlapping frequency bins. In an implementation, a frequency spacing may be determined between the one or more RF signals within the plurality of frequency bins. The frequency spacing may be compared to a frequency bin size selected from the first frequency bin size of the default resolution mode 110A, the second frequency bin size of the first resolution mode 110B, or the third frequency bin size of the second resolution mode 110C. The determination of each of the first degree of overlap or the second degree of overlap may be based on the comparison.

At operation 310, the default resolution mode 110A may transition to one of the first resolution mode 110B or the second resolution mode 110C based on the assigned complexity level. The first resolution mode 110B may be associated with the second frequency bin size different from the first frequency bin size, and the second resolution mode 110C may be associated with the third frequency bin size different from the first frequency bin size and the second frequency bin size. The second frequency bin size of the first resolution mode 110B is less than the first frequency bin size of the default resolution mode 110A. The third frequency bin size of the second resolution mode 110C is less than the second frequency bin size of the first resolution mode 110B. The control passes to operation 314 of FIG. 3B.

At operation 312, the subcarrier spacing parameter associated with the first frequency bin size may be adjusted for the transition from the default resolution mode 110A to one of the first resolution mode 110B or the second resolution mode 110C.

With reference to FIG. 3B, operations 314 to 330 are shown. At operation 314, the plurality of frequency bins may be updated based on the adjusted subcarrier spacing parameter.

At operation 316, processing resources may be reallocated proportionate to a computational load associated with one of the first resolution mode 110B or the second resolution mode 110C, where the reallocation of the processing resources may be based on the update of the plurality of frequency bins.

At operation 318, subcarriers of the plurality of frequency bins may be associated with the one or more RF signals based on the transition to the different frequency bin size of one of the first resolution mode 110B or the second resolution mode 110C.

At operation 320, bandwidth may be allocated to each of the subcarriers based on signal characteristics of the one or more RF signals.

At operation 322, the signal characteristics of the one or more RF signals may be monitored. The signal characteristics may be selected from the group consisting of a frequency spacing value that indicates an extent of spacing between the one or more RF signals within the plurality of frequency bins, a bandwidth of each of the one or more RF signals, and a SNR of each of the one or more RF signals.

At operation 324, re-transition may be executed from one of the first resolution mode 110B or the second resolution mode 110C to the default resolution mode 110A based on the frequency spacing value that is greater than the first frequency bin size of the default resolution mode 110A.

At operation 326, switching may be executed among the default resolution mode 110A, the first resolution mode 110B, and the second resolution mode 110C within a threshold time based on a change in the monitored signal characteristics of the one or more RF signals.

At operation 328, the SNR may be determined in one of the first resolution mode 110B or the second resolution mode 110C.

At operation 330, a different resolution mode may be transitioned from among the default resolution mode 110A, the first resolution mode 110B, and the second resolution mode 110C based on a combination of the assigned complexity level, one or more defined SNR thresholds, and the determined SNR.

Various embodiments of the disclosure may provide the wireless communication device 104A that may include the processor 230. The processor 230 may be configured to receive radio frequency (RF) signal data of one or more RF signals associated with one or more RF signal sources (e.g., the RF signal sources 106A, 106B, . . . , 106N). The processor 230 may be further configured to generate a plurality of frequency bins from the received RF signal data based on the default resolution mode 110A preset at the wireless communication device 104A. The default resolution mode 110A is associated with a first frequency bin size. The processor 230 may be further configured to determine whether the one or more RF signals are present in one of: overlapping frequency bins or distinct frequency bins within the plurality of frequency bins. The processor 230 may be further configured to assign a complexity level to the received RF signal data based on the determination that the one or more RF signals may be present in one of the overlapping frequency bins or the distinct frequency bins. The processor 230 may be further configured to transition from the default resolution mode 110A to one of the first resolution mode 110B or the second resolution mode 110C based on the assigned complexity level. The first resolution mode 110B is associated with the second frequency bin size different from the first frequency bin size, and the second resolution mode 110C is associated with the third frequency bin size different from the first frequency bin size and the second frequency bin size.

Various embodiments of the disclosure may provide a computer program product, the computer program product comprising a non-transitory computer-readable storage medium having program instructions embodied therewith, the program instructions may be executed by the computer of the wireless communication device 104A to cause the computer to execute operations. The operations may include receiving radio frequency (RF) signal data of one or more RF signals associated with the one or more RF signal sources. The operations may further include generating a plurality of frequency bins from the received RF signal data based on the default resolution mode 110A. The default resolution mode 110A may be associated with a first frequency bin size. The operations may further include determining that the one or more RF signals are present in one of overlapping frequency bins or distinct frequency bins within the plurality of frequency bins. The operations may further include assigning a complexity level to the received RF signal data based on the determination that the one or more RF signals may be present in the overlapping frequency bins or the distinct frequency bins. The operations may further include transitioning from the default resolution mode 110A to one of the first resolution mode 110B or the second resolution mode 110C based on the assigned complexity level. The first resolution mode 110B may be associated with the second frequency bin size different from the first frequency bin size, and the second resolution mode 110C is associated with the third frequency bin size different from the first frequency bin size and the second frequency bin size.

While various embodiments described in the present disclosure have been described above, it should be understood that they have been presented by way of example, and not limitation. It is to be understood that various changes in form and detail can be made therein without departing from the spirit and scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g. computer readable code, program code, and/or instructions disposed in any form, such as source, object or machine language) disposed for example in computer-readable storage medium such as a non-transitory computer-readable medium configured to store the software. Such software can enable, for example, the function, fabrication, modeling, simulation, description and/or testing of the apparatus and methods described herein. For example, this can be accomplished using general program languages (e.g., C, C++), hardware description languages (HDL) including Verilog HDL, VHDL, and so on, or other available programs. Such software can be disposed of in any known computer-readable storage medium such as non-transitory computer-readable medium, such as semiconductor, magnetic disc, or optical disc (e.g., CD-ROM, DVD-ROM, etc.). The software can also be disposed of as computer data embodied in a computer-readable storage medium such as non-transitory computer-readable transmission medium (e.g., solid state memory any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the Internet and intranets.

It is to be further understood that the system described herein may be included in a semiconductor intellectual property core, such as a microprocessor core (e.g., embodied in HDL) and transformed to hardware in the production of integrated circuits. Additionally, the system described herein may be embodied as a combination of hardware and software. Thus, the present disclosure should not be limited by any of the above-described exemplary embodiments but should be defined only in accordance with the following claims and their equivalents.

Various aspects of the present disclosure are described by narrative text, flowcharts, diagrams of computer systems and/or diagrams of the machine logic included in various computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated operation, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is a tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

What is claimed is:

1. A wireless communication device, comprising:

a processor configured to:

receive radio frequency (RF) signal data of one or more RF signals associated with one or more RF signal sources;

generate a plurality of frequency bins from the received RF signal data based on a default resolution mode preset at the wireless communication device, wherein the default resolution mode is associated with a first frequency bin size;

determine that the one or more RF signals are present in one of overlapping frequency bins or distinct frequency bins within the plurality of frequency bins;

assign a complexity level to the received RF signal data based on the determination that the one or more RF signals are present in one of the overlapping frequency bins or the distinct frequency bins; and transition from the default resolution mode to one of a first resolution mode or a second resolution mode based on the assigned complexity level, wherein the first resolution mode is associated with a second frequency bin size different from the first frequency bin size, and the second resolution mode is associated with a third frequency bin size different from the first frequency bin size and the second frequency bin size.

2. The wireless communication device of claim 1, wherein the second frequency bin size of the first resolution mode is less than the first frequency bin size of the default resolution mode, and the third frequency bin size of the second resolution mode is less than the second frequency bin size of the first resolution mode.

3. The wireless communication device of claim 1, wherein, for the assignment of the complexity level, the processor is further configured to:

determine the complexity level as a first complexity level based on the one or more RF signals present in the distinct frequency bins; or determine the complexity level as a second complexity level higher than the first complexity level based on the one or more RF signals present with a first degree of overlap in the overlapping frequency bins; or determine the complexity level as a third complexity level higher than the second complexity level based on the one or more RF signals present with a second degree of overlap in the overlapping frequency bins.

4. The wireless communication device of claim 3, wherein the processor is further configured to:

determine a frequency spacing between the one or more RF signals within the plurality of frequency bins; and compare the frequency spacing to a frequency bin size selected from: the first frequency bin size of the default resolution mode, the second frequency bin size of the first resolution mode, or the third frequency bin size of the second resolution mode, wherein the determination of each of the first degree of overlap or the second degree of overlap is based on the comparison.

5. The wireless communication device of claim 1, wherein the processor is further configured to monitor signal characteristics of the one or more RF signals, wherein the signal characteristics are selected from the group consisting of:

a frequency spacing value that indicates an extent of spacing between the one or more RF signals within the plurality of frequency bins, a bandwidth of each of the one or more RF signals, and a signal-to-noise ratio of each of the one or more RF signals.

6. The wireless communication device of claim 5, wherein the processor is further configured to:

re-transition from one of the first resolution mode or the second resolution mode to the default resolution mode based on the frequency spacing value that is greater than the first frequency bin size of the default resolution mode.

7. The wireless communication device of claim 5, wherein the processor is further configured to switch among the default resolution mode, the first resolution mode, and the second resolution mode within a threshold time based on a change in the monitored signal characteristics of the one or more RF signals.

8. The wireless communication device of claim 1, wherein the processor is further configured to:

determine a signal-to-noise ratio (SNR) in one of the first resolution mode or the second resolution mode; and transition to a different resolution mode from among the default resolution mode, the first resolution mode, or the second resolution mode based on a combination of the assigned complexity level, one or more defined SNR thresholds, and the determined SNR.

9. The wireless communication device of claim 1, wherein the processor is further configured to:

adjust a subcarrier spacing parameter associated with the first frequency bin size for the transition from the default resolution mode to one of the first resolution mode or the second resolution mode; and update the plurality of frequency bins based on the subcarrier spacing parameter.

10. The wireless communication device of claim 9, wherein the processor is further configured to reallocate processing resources proportionate to a computational load associated with one of the first resolution mode or the second resolution mode, wherein the reallocation of the processing resources is based on the update of the plurality of frequency bins.

11. The wireless communication device of claim 10, wherein the processor is further configured to:

associate subcarriers of the plurality of frequency bins to the one or more RF signals based on the transition to the different frequency bin size of one of the first resolution mode or the second resolution mode; and allocate bandwidth to each of the subcarriers based on signal characteristics of the one or more RF signals.

12. The wireless communication device of claim 1, further comprising one or more antenna arrays configured to receive the one or more RF signals in vertical and horizontal polarizations across a plurality of frequency bands.

13. The wireless communication device according to claim 12, further comprising a radio frequency (RF) front-end coupled to the one or more antenna arrays and configured to:

apply band-specific filtering to the received one or more RF signals to isolate signals-of-interest; and convert and digitize the signals-of-interest to predefined intermediate frequency bands to obtain the RF signal data.

14. The wireless communication device according to claim 13, wherein the predefined intermediate frequency bands correspond to two or more of: 2.4 gigahertz (GHz), 5 GHz, 6 GHz, 7 GHz, or an unlicensed or industrial, scientific, or medical (ISM) frequency band.

15. A method, comprising:

in a wireless communication device:

receiving radio frequency (RF) signal data of one or more RF signals associated with one or more RF signal sources;

generating a plurality of frequency bins from the received RF signal data based on a default resolution mode, wherein the default resolution mode is associated with a first frequency bin size;

determining that the one or more RF signals are present in one of: overlapping frequency bins or distinct frequency bins within the plurality of frequency bins;

assigning a complexity level to the received RF signal data based on the determining; and transitioning from the default resolution mode to one of a first resolution mode or a second resolution mode based on the assigned complexity level, wherein the first resolution mode is associated with a second frequency bin size different from the first frequency bin size, and the second resolution mode is associated with a third frequency bin size different from the first frequency bin size and the second frequency bin size.

16. The method of claim 15, wherein the second frequency bin size of the first resolution mode is less than the first frequency bin size of the default resolution mode, and the third frequency bin size of the second resolution mode is less than the second frequency bin size of the first resolution mode.

17. The method of claim 15, further comprising:

determining a signal-to-noise ratio (SNR) in one of the first resolution mode or the second resolution mode; and transitioning to a different resolution mode from among the default resolution mode, the first resolution mode, or the second resolution mode based on a combination of the assigned complexity level, one or more defined SNR thresholds, and the determined SNR.

18. The method of claim 15, further comprising:

adjusting a subcarrier spacing parameter associated with the first frequency bin size for the transition from the default resolution mode to one of the first resolution mode or the second resolution mode; and updating the plurality of frequency bins based on the adjusted subcarrier spacing parameter.

19. The method of claim 15, further comprising monitoring signal characteristics of the one or more RF signals, wherein the signal characteristics are selected from the group consisting of:

a frequency spacing value that indicates an extent of spacing between the one or more RF signals within the plurality of frequency bins, a bandwidth of each of the one or more RF signals, and a signal-to-noise ratio of each of the one or more RF signals.

20. A computer program product for adaptive spectrum analysis, the computer program product comprising a non-transitory computer-readable storage medium having program instructions embodied therewith, the program instructions executable by a processor to cause the processor to:

receive radio frequency (RF) signal data of one or more RF signals associated with one or more RF signal sources;

generate a plurality of frequency bins from the received RF signal data based on a default resolution mode, wherein the default resolution mode is associated with a first frequency bin size;

determine that the one or more RF signals are present in one of: overlapping frequency bins or distinct frequency bins within the plurality of frequency bins;

assign a complexity level to the received RF signal data based on the determination that the one or more RF signals are present in the overlapping frequency bins or the distinct frequency bins; and transition from the default resolution mode to one of a first resolution mode or a second resolution mode based on the assigned complexity level, wherein the first resolution mode is associated with a second frequency bin size different from the first frequency bin size, and the second resolution mode is associated with a third frequency bin size different from the first frequency bin size and the second frequency bin size.

* * * * *